(12) United States Patent
Jordan

(10) Patent No.: US 9,362,802 B2
(45) Date of Patent: Jun. 7, 2016

(54) SYSTEM FOR INSTRUMENTING AND MANIPULATING APPARATUSES IN HIGH VOLTAGE

(71) Applicant: JEFFERSON SCIENCE ASSOCIATES, LLC, Newport News, VA (US)

(72) Inventor: Kevin Jordan, Newport News, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 0 days.

(21) Appl. No.: 14/645,387

(22) Filed: Mar. 11, 2015

(65) Prior Publication Data

US 2015/0263588 A1 Sep. 17, 2015

Related U.S. Application Data

(60) Provisional application No. 61/951,817, filed on Mar. 12, 2014.

(51) Int. Cl.
*H02K 7/18* (2006.01)
*H01H 33/32* (2006.01)
*H04B 3/44* (2006.01)

(52) U.S. Cl.
CPC .............. *H02K 7/1807* (2013.01); *H01H 33/32* (2013.01); *H04B 3/44* (2013.01)

(58) Field of Classification Search
CPC ..................................................... H02K 7/1807
USPC .......................................................... 290/1 R
See application file for complete search history.

(56) References Cited

U.S. PATENT DOCUMENTS

| 2,840,729 | A | * | 6/1958 | Kreuthmeir | H02N 1/08 310/309 |
|---|---|---|---|---|---|
| 3,506,774 | A | * | 4/1970 | Gard | H01B 3/16 174/17 GF |
| 6,024,935 | A | * | 2/2000 | Mills | F02G 1/043 376/100 |
| 2013/0084474 | A1 | * | 4/2013 | Mills | H01M 4/9016 429/9 |
| 2013/0321034 | A1 | * | 12/2013 | Crane | H01L 23/051 327/109 |
| 2014/0160612 | A1 | * | 6/2014 | Rostron | H02B 5/06 361/115 |

* cited by examiner

*Primary Examiner* — Joseph Waks

(57) ABSTRACT

A system for energizing, operating and manipulating apparatuses in high voltage systems. The system uses a dielectric gas such as $SF_6$ as a driving power supply for a pneumatic motor which ultimately charges a battery or other energy storage device. The stored energy can then be used for instrumentation equipment, or to power any electrical equipment, in the high voltage deck. The accompanying method provides for the use of the SF6 system for operating an electrical device in a high-voltage environment.

10 Claims, 3 Drawing Sheets

US 9,362,802 B2

SYSTEM FOR INSTRUMENTING AND MANIPULATING APPARATUSES IN HIGH VOLTAGE

This application claims priority from U.S. Provisional Patent application No. 61/951,817 filed on Mar. 12, 2014.

The United States of America may have certain rights to this invention under Management and Operating Contract No. DE-AC05-06OR23177 from the Department of Energy.

FIELD OF THE INVENTION

The present invention relates to a device and method in the field of high voltage systems, and, more particularly, to a device and method for the operation and energization of apparatuses, including instrumentation, in high-voltage applications.

BACKGROUND OF THE INVENTION

High voltage systems are used in a variety of commercial, industrial, medical, and research applications. These uses include high voltage electron guns and neutrino telescopes.

Instrumenting high voltage systems and powering and manipulating various apparatuses in high voltage systems is very difficult since no metallic connections can be made. This often leads to difficulties in measuring and monitoring various parameters in these types of systems.

One prime example of these difficulties can be found in relation to a photocathode gun used in systems such as energy-recovery linacs and free-electron lasers. In such devices, the operating current is very low, in the order of nano or even pico amperes. Measurement of this current is essential in order to monitor and, potentially, limit field emissions in the device. There are currently no efficient and/or cost-effective means for obtaining an accurate measurement of such small current in high-voltage photocathode applications. It is further desirable that any such means of measurement should avoid the use of metallic connections.

It is therefore preferable to have a system and device which allows the manipulation and operation of instrumentation, and any other apparatuses, under high voltage conditions. The instant invention provides a solution to the foregoing need.

OBJECT OF THE INVENTION

It is an object of the invention to provide a method and apparatus which facilitates the energization, operation, and manipulation of instruments, devices, and other components in high-voltage systems.

SUMMARY OF THE INVENTION

The present invention discloses a system and method for energizing, manipulating, and operating instrumentation and other electrical apparatuses in high-voltage applications. The system relies upon a dielectric gas, such as Sulfur Hexafluoride ($SF_6$), which is used to power or manipulate devices or apparatuses in the application.

In one embodiment, the system includes a pneumatic motor, a DC motor-generator set, and a battery. The pneumatic motor is powered by the dielectric gas which is used to avoid certain dangers or difficulties when operating in a high-voltage environment. A second embodiment uses the gas to directly manipulate elements or components found in a high-voltage device. The invention further discloses two methods of using this system.

DETAILED DESCRIPTION

The present invention discloses a device and a method for energizing, manipulating, and operating devices and apparatuses in high voltage and ultra-high voltage environments. The system is such that it does not employ any metallic connections and can therefore be utilized in these high-voltage applications. An insulating gas is used to power a motor and actuate devices within the high-voltage environment. The term "high voltage", as used herein, refers to voltages of 100,000-500,000 volts or more, which can be either Alternating Current (AC) or Direct Current (DC).

Dielectric gases having electrically insulating properties are often used in high-voltage applications. One of the most frequently used insulating gases is Sulfur Hexafluoride ($SF_6$) due to its high dielectric strength and excellent arc quenching properties. Although $SF_6$ is considered to be a potent greenhouse gas, the risks of use are negligible when used properly in a closed containment/recovery system.

Figure 1:
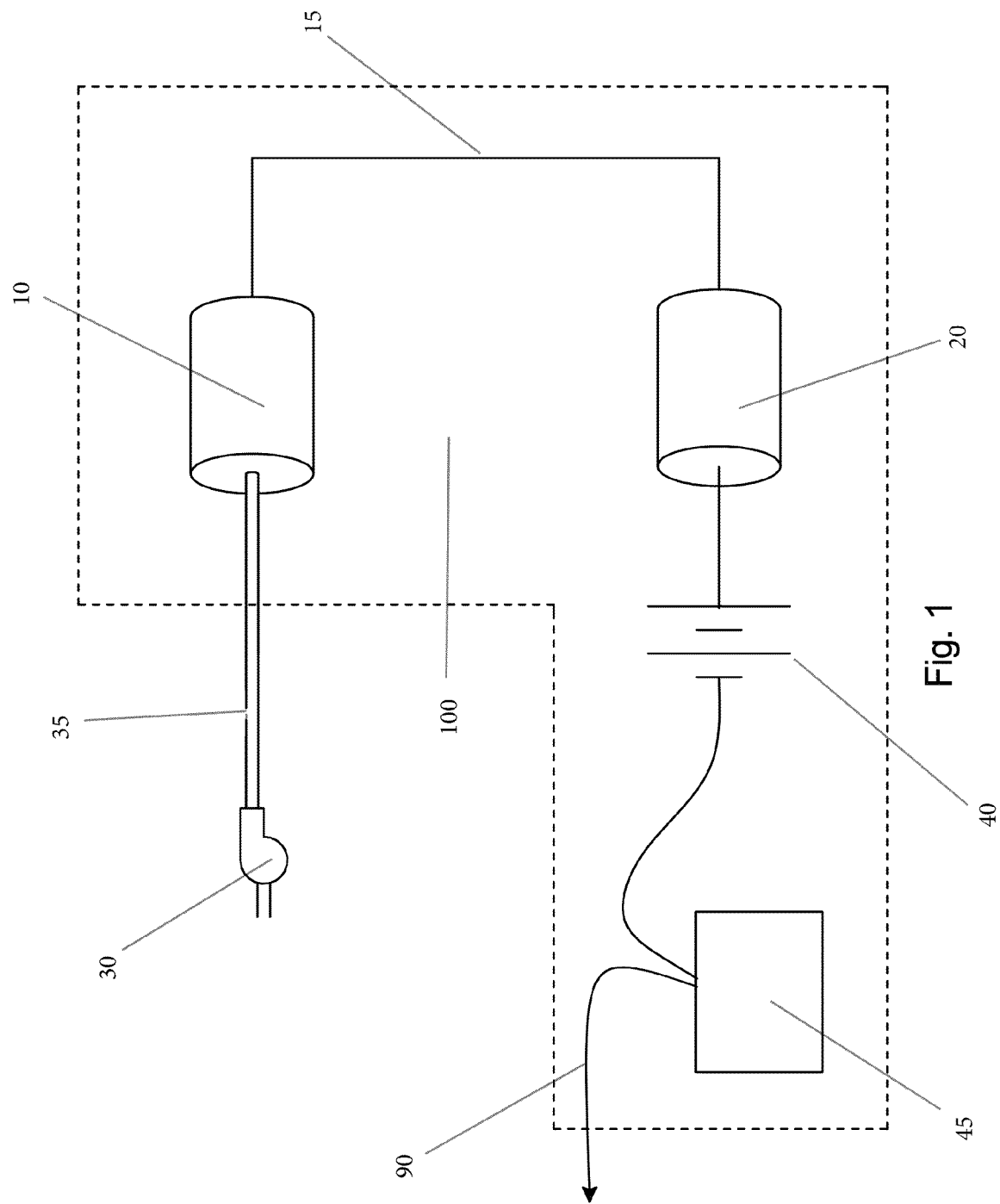
FIG. 1 is a diagram of certain core components of the system disclosed in the present invention.

In a first embodiment, $SF_6$ is used in conjunction with a motor-generator set to provide isolated power for an instrumentation device in a high-voltage application. As shown in FIG. 1, a pneumatic motor 10 is mechanically coupled via coupling shaft 15 to a DC Motor-Generator set 20. $SF_6$ gas is drawn via pump 30 from a gas source and supplied under high pressure via nylon hose 35 to the pneumatic motor 10. The pressurized $SF_6$ drives the pneumatic motor 10 which powers the DC motor-generator 20.

The DC Motor generator set 20 is then connected to, and charges, a battery 40. It will be noted that a super-capacitor could be substituted in place of the battery. The battery 40 or super-capacitor can then be used to power instrumentation 45 or other electrical components at the high voltage deck 100.

Figure 2:
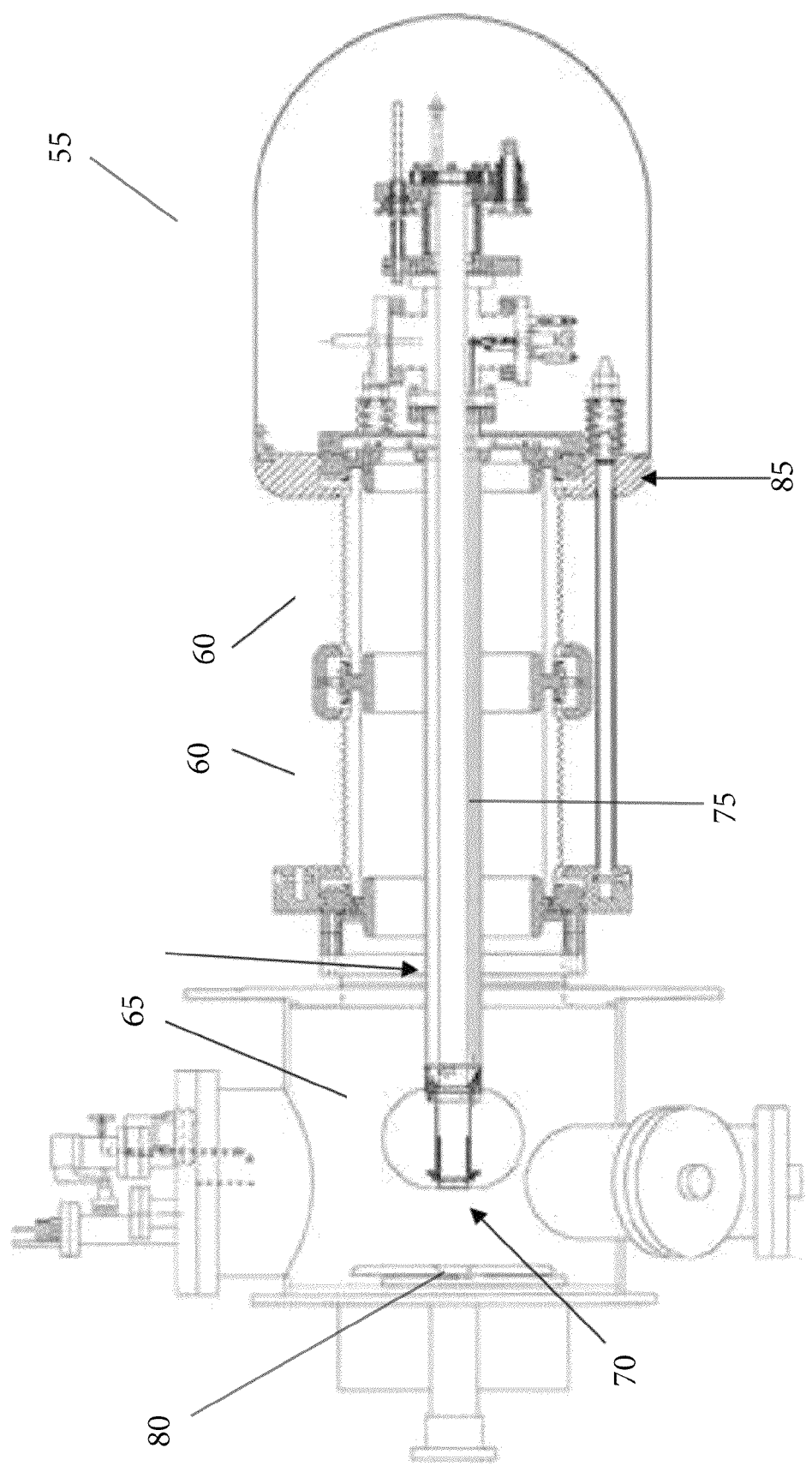
FIG. 2 is an illustration of the system installed in a photocathode gun.

One use of this embodiment is to power ultra-high voltage instrumentation in GaAs photocathode guns being used in ERL and FEL applications. As seen in FIG. 2, a DC photocathode gun 55 is shown having a convoluted ceramic insulator 60, a vacuum chamber 65, a ball cathode 70 mounted on the end of a photocathode stalk 75, an anode 80, and a high-voltage feed 85.

It is extremely beneficial to maintain an accurate measurement of the current in the system as the current measurement provides insight into the presence of unwanted field emissions. Such emissions are deleterious as these emitted electrons are highly energetic and can embed themselves in the ceramic insulating structure. Ultimately, these electrons can potentially make their way through to ground making a hole in the insulator. The overall current monitoring process is therefore critical to the survivability of the whole photocathode system. The present state of technology makes it difficult to measure the very small currents that must be monitored in order to determine and prevent the onset of field emissions.

The present invention can be used to power an instrumentation package inserted between the high voltage connection and the photocathode stalk which can, among other tasks, accurately measure the current in the system. The current may be determined by measuring voltage drop against a small value resistor. Data concerning the current is transmitted through a fiber optic cable 90, shown in FIG. 1, which connects the instrumentation package with a computer or other output, analysis, or recording device 130, which will normally be outside the high-voltage deck.

The data can be transmitted in a variety of forms. One method includes a microprocessor (not shown) incorporating Ethernet communication protocols into the instrumentation package. Complex data can then be transmitted along the cable 90 a standard Ethernet communication. Of course a microprocessor need not be used and a simple voltage to frequency convertor can be used to emit light pulses along the fiber optic cable 90 based upon the current values.

Figure 3:
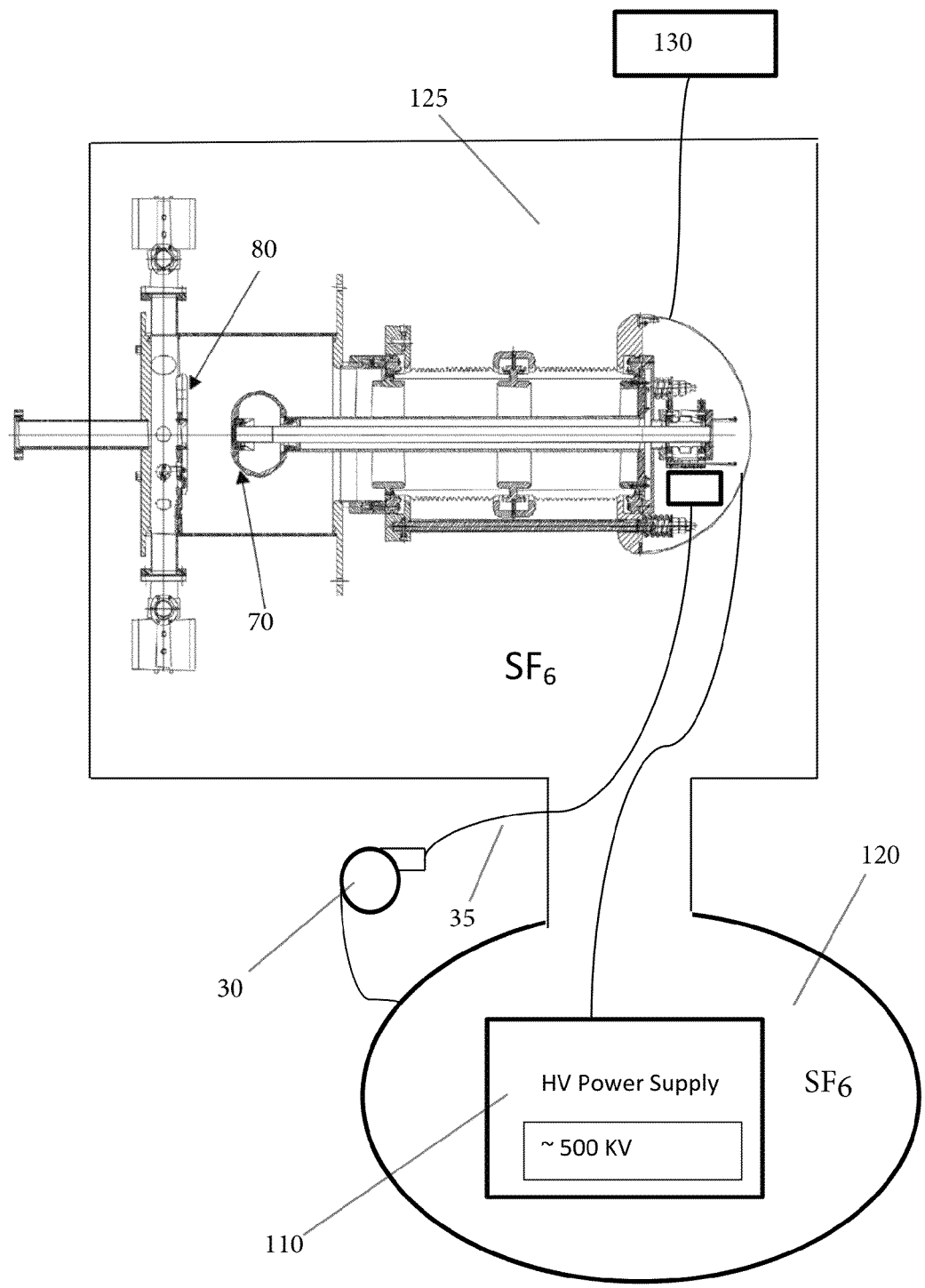
FIG. 3 is a second illustration of the system installed in a photocathode gun.

As seen in FIG. 3, a high voltage power supply 110 resides within a tank of $SF_6$ gas 120. A pump 30 is located exterior to the supply of $SF_6$ 120. $SF_6$ gas is drawn via pump 30 from tank 120 and pumped under pressure via hose 35 into the pneumatic motor 10. After actuating the pneumatic motor 10, the gas is vented to the sealed enclosure 125 surrounding the high-voltage system. The sealed enclosure 125 can be in direct communication with the tank 120 as shown in FIG. 3. A desiccant dryer (not shown) may be interposed in the $SF_6$ flow either on the high pressure side or low pressure side of the pump 30.

A second embodiment of the present invention can be used for mechanical actuation in high-voltage applications. More specifically, the pressure of the insulating gas can be used to operate a switch or other such device in environments where arcing and electrical discharges are of concern.

The uses of this embodiment can also be illustrated through use in a GaAs or multi-alkali photocathode gun. A photocathode gun typically includes a resistor between the power supply and the photocathode. It is desirable that such a resistor operate as a high-value resistor during high voltage processing of the gun and then a low-value resistor during the actual operation of the gun.

This can be achieved by incorporating a high-value resistor having an internal plunger, also known as a dual resistor. The dual resistor includes a conditioning resistor at a high resistance value and a run resistor at a low resistance value. The run resistor can travel inside the conditioning resistor via the plunger. When required, the plunger can be depressed until an electrical path is completed through the run resistor thereby shorting out the resistor and effectively resulting in a low-value resistor. $SF_6$ can be used to operate a pneumatic motor which moves or flips the plunger in whichever direction is so desired. This greatly facilitates alternating between the conditioning and running states of the photocathode gun.

The use of $SF_6$ in the foregoing applications helps to prevent any unwanted discharges and serves to quench such discharges if there were to occur. It also allows the user to generate isolated power that can be utilized within a high-voltage environment without the need for metallic connections. The system and method disclosed herein can be used in high-voltage applications with voltages extending up to approximately a megavolt.

While the invention has been described in reference to certain preferred embodiments, it will be readily apparent to one of ordinary skill in the art that certain modifications or variations may be made to the system without departing from the scope of the invention claimed below and described in the foregoing specification.

What is claimed is:

1. An apparatus for operating an electrical device in a high-voltage environment comprising:
   a source of dielectric gas;
   a pneumatic motor;
   a pump in gas communication with said source of dielectric gas and said pneumatic motor;
   a motor-generator set; said motor-generator being mechanically coupled to said pneumatic motor;
   an energy storage device in electrical communication with said motor-generator set, wherein the motor-generator is adapted to supply electrical power to said energy storage device and an electrical device operating in said high-voltage environment is adapted to receive electrical power from the energy storage device.

2. The power-supply apparatus of claim 1 wherein said dielectric gas is Sulfur Hexafluoride.

3. The power-supply apparatus of claim 2 wherein said motor-generator is a DC motor-generator.

4. The power-supply apparatus of claim 3 wherein said energy storage device is a battery.

5. The power-supply apparatus of claim 3 wherein said energy storage device is a super-capacitor.

6. A method for operating an electrical device in a high-voltage environment comprising:
   providing a source of pressurized Sulfur Hexafluoride gas, a pneumatic motor, a DC motor-generator set configured to charge an energy storage device, and an energy storage device; and, further comprising:
   supplying said pressurized Sulfur Hexafluoride gas to said pneumatic motor and thereby powering said motor via the flow of said gas;
   utilizing the mechanical power output of said pneumatic motor to drive said DC motor-generator set;
   charging said energy storage device via the output of said DC motor-generator set; and, using said energy storage device to supply power to said electrical device in a high-voltage environment.

7. The method of claim 6 wherein said energy storage device is a battery.

8. The method of claim 6 wherein said energy storage device is a super-capacitor.

9. The method of claim 6 wherein said electrical device includes a microprocessor.

10. A method for operating an electrical device in a high-voltage environment comprising: providing a source of pressurized Sulfur Hexafluoride gas and a dual resistor; and, further comprising using the pressurized gas to manipulate a plunger within said dual resistor thereby opening and closing an electrical path through said resistor.

* * * * *